US012594712B2

(12) United States Patent　　　　　(10) Patent No.:　　US 12,594,712 B2
Finke　　　　　　　　　　　　　　　(45) Date of Patent:　　　　Apr. 7, 2026

(54) METHOD FOR PRODUCING A THREE-DIMENSIONAL OBJECT, AND DEVICE THEREFOR

(71) Applicant: OTTOBOCK SE & CO. KGAA, Duderstadt (DE)

(72) Inventor: Lars Benjamin Finke, Landolfshausen (DE)

(73) Assignee: OTTOBOCK SE & CO. KGAA, Duderstadt (DE)

( * ) Notice: Subject to any disclaimer, the term of this patent is extended or adjusted under 35 U.S.C. 154(b) by 549 days.

(21) Appl. No.: 18/001,975

(22) PCT Filed: Jul. 1, 2021

(86) PCT No.: PCT/EP2021/068270
§ 371 (c)(1),
(2) Date: Dec. 15, 2022

(87) PCT Pub. No.: WO2022/008356
PCT Pub. Date: Jan. 13, 2022

(65) Prior Publication Data
US 2023/0347573 A1　　　Nov. 2, 2023

(30) Foreign Application Priority Data
Jul. 8, 2020　　(DE) ..................... 10 2020 118 033.0

(51) Int. Cl.
B29C 64/106　　　(2017.01)
B29C 64/209　　　(2017.01)
(Continued)

(52) U.S. Cl.
CPC .......... B29C 64/106 (2017.08); B29C 64/209 (2017.08); B29C 64/241 (2017.08);
(Continued)

(58) Field of Classification Search
CPC ... B29C 64/106; B29C 64/209; B29C 64/241; B29C 64/321; B29C 64/40;
(Continued)

(56) References Cited

U.S. PATENT DOCUMENTS

| 2016/0067918 A1 | 3/2016 | Millar | |
| 2016/0263827 A1* | 9/2016 | Fripp | B29C 64/124 |

(Continued)

FOREIGN PATENT DOCUMENTS

| DE | 10 2018 124 516 A1 | 4/2020 |
| WO | 2020/069817 A1 | 4/2020 |

*Primary Examiner* — Michael M. Robinson
(74) *Attorney, Agent, or Firm* — WCF IP

(57)　　　　　　　ABSTRACT

The invention relates to a method for producing a three-dimensional object by means of an additive manufacturing process in which a manufacturing material is fed in a free-flowing state through at least one feed-in opening of at least one feed-in needle into a supporting material and then cured, the feed-in opening being configured in such a way that manufacturing material can be fed through it into the supporting material along a feed-in line, wherein the feed-in needle moves from a starting position to an end position that are so close together that the feed-in needle moves along an at least almost closed path, wherein the course, the extension and/or the length of the feed-in line is selected such that the three-dimensional object is produced with a single revolution of the feed-in needle.

3 Claims, 3 Drawing Sheets

Figure 1:
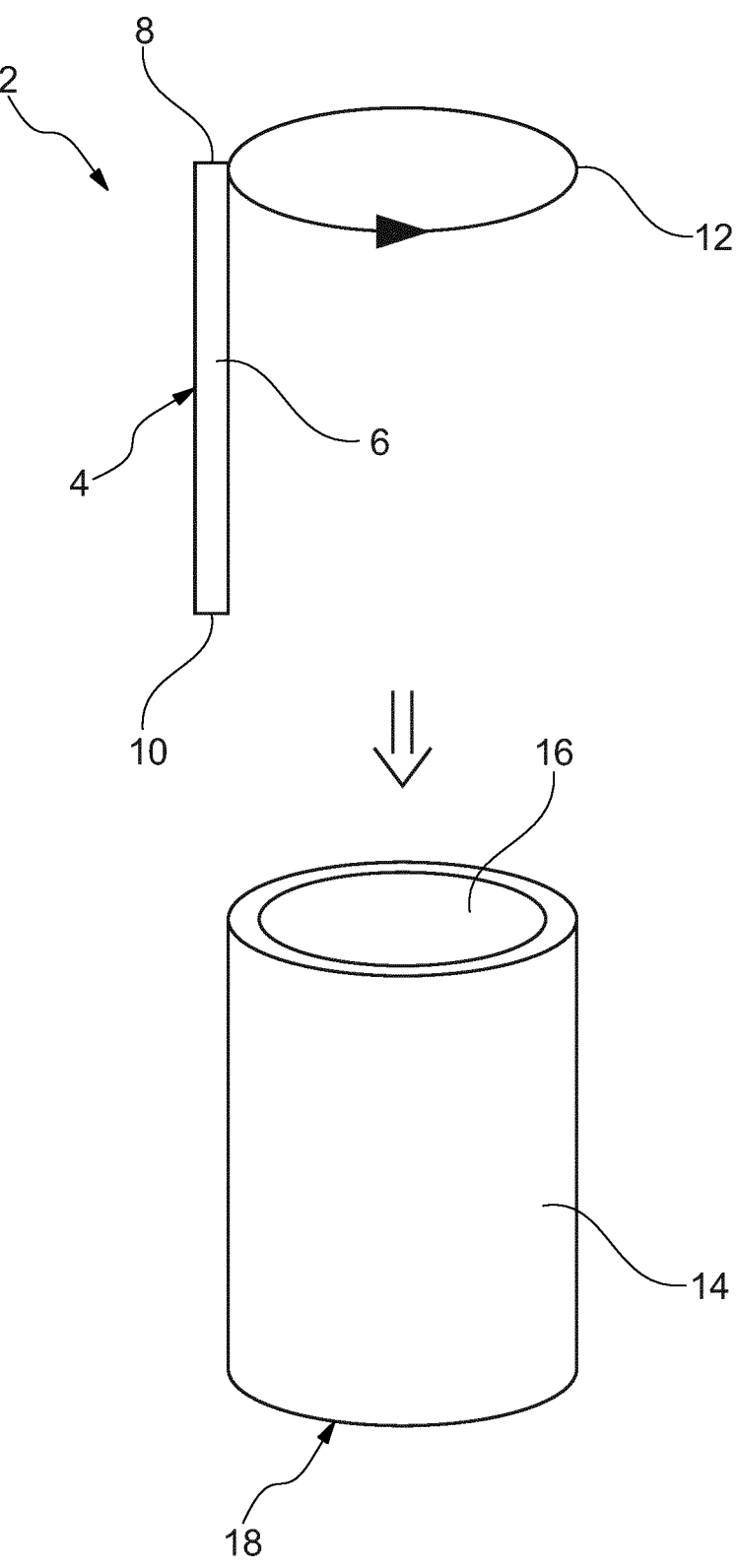

(51) Int. Cl.

| | |
|---|---|
| *B29C 64/241* | (2017.01) |
| *B29C 64/321* | (2017.01) |
| *B29L 31/00* | (2006.01) |
| *B33Y 10/00* | (2015.01) |
| *B33Y 30/00* | (2015.01) |
| *B33Y 80/00* | (2015.01) |

(52) U.S. Cl.
CPC ..... *B29C 64/321* (2017.08); *B29L 2031/7532* (2013.01); *B33Y 10/00* (2014.12); *B33Y 30/00* (2014.12); *B33Y 80/00* (2014.12)

(58) Field of Classification Search
CPC . B29L 2031/7532; B33Y 10/00; B33Y 30/00; B33Y 80/00
See application file for complete search history.

(56) References Cited

U.S. PATENT DOCUMENTS

| | | | |
|---|---|---|---|
| 2018/0281295 A1* | 10/2018 | Tibbits | B29C 64/40 |
| 2020/0361145 A1* | 11/2020 | Tsao | B29C 64/241 |
| 2020/0398469 A1* | 12/2020 | Yuwaki | B29C 45/47 |
| 2021/0055710 A1* | 2/2021 | Borish | G05B 19/4099 |
| 2022/0031480 A1 | 2/2022 | Bause et al. | |

* cited by examiner

METHOD FOR PRODUCING A THREE-DIMENSIONAL OBJECT, AND DEVICE THEREFOR

The invention relates to a method for producing a three-dimensional object by means of an additive manufacturing process in which a manufacturing material is fed in a free-flowing state through at least one feed-in opening of at least one feed-in needle into a supporting material and is then cured, the feed-in opening being configured in such a way that manufacturing material can be fed through it into the supporting material along a feed-in line. The invention also relates to a device for conducting such a method.

Nowadays, many types of additive manufacturing process are known from the prior art and are used to produce a wide range of three-dimensional objects. Traditionally, additive manufacturing processes are hardly suitable for producing large quantities of the respective objects, as the production of individual objects takes a lot of time. In additive manufacturing processes, especially 3D printing, the object to be produced is built up of a number of very thin layers arranged on top of each other, which are often just a few millimetres thick. As a result, the production of large objects in particular is time-consuming and has therefore not yet become established for the production of large quantities.

In the last few years, a great deal of progress has been made in this area. For example, MIT developed a three-dimensional printing process that was published in US 2018/281295 A1, for example. In this case, the object to be produced is made in a container that contains a gel suspension or another material as a support material which does not chemically react with the manufacturing material. It serves only to support the manufacturing material as long as it is not yet cured or sufficiently cross-linked. In the method, the manufacturing material is introduced in a free-flowing state, for example as a liquid or gel, at the desired position within the support material. At least one feed-in needle is used for this purpose, which can be displaced in three directions that are linearly independent of one another. Due to the rheological properties of the materials and the density ratios between the manufacturing material and the support material, the manufacturing material that has been introduced remains in the respective position, so that three-dimensional objects can be printed especially quickly by bringing the manufacturing material to the desired points and subsequently cross-linking, setting or curing it there. This process is significantly faster than previous 3D printing methods and also makes it possible to produce flexible or elastic objects and use a wider range of materials established in traditional casting processes. A similar method is described by the company NSTRMNTS at http://nstrmnt.com/#/suspended-depositions/.

However, in this method, too, flat objects are built up from a large number of different layers arranged on top of each other, meaning that this method is also time-consuming.

The invention therefore aims to improve a regular method in such a way that three-dimensional objects can be produced more quickly.

The invention solves the addressed problem by way of a method according to the preamble of claim 1, characterized in that the feed-in opening is configured in such a way that manufacturing material can be fed through it into the support material along a feed-in line, and that the feed-in needle moves from a starting position to an end position that are so close together that the feed-in needle moves along an at least almost closed path, wherein the course, the extension and/or the length of the feed-in line is selected such that the three-dimensional object is produced with a single revolution of the feed-in needle.

According to the invention, it is therefore possible to introduce the manufacturing material into the support material along a feed-in line. The feed-in line extends along the feed-in needle. Preferably, it is possible to introduce manufacturing material into the support material simultaneously along the entire feed-in line. In this case, the shape of the feed-in line is adapted to the object to be produced. It can normally not be altered during production. If a different feed-in line is to be used, the at least one feed-in needle normally has to be changed. To do so, production is preferably interrupted, the feed-in needle to be changed is removed from the container and replaced with another feed-in needle that then becomes part of a production device used to carry out the method.

The feed-in needle moves along a path that is at least almost, but preferably completely, closed. Consequently, the object to be produced also obtains an at least almost, but preferably completely, closed cross-section. Due to the combination of the feed-in line with the at least almost closed path, along which the feed-in needle moves, a three-dimensional object is created after just one revolution along the path. If the course, extension and/or length of the feed-in line is carefully selected, it means that at least a large part of the three-dimensional object to be produced, but preferably the entire three-dimensional object, can be produced with a single revolution of the feed-in needle along the path. This makes the method significantly faster and reduces production costs.

When moved from the starting position to the end position, the feed-in needle is preferably moved in such a way that the feed-in opening has a defined, preferably temporally fixed, orientation relative to the direction of movement of the feed-in needle, the feed-in opening preferably pointing backwards in the direction of movement or transversely to the direction of movement. In this case, transversely to the direction of movement specifically means that the feed-in opening points in a direction that is perpendicular to the current direction of movement of the feed-in needle.

Preferably, the feed-in needle cannot only be moved along three directions, but is also rotatably mounted about a rotational axis, which is preferably the longitudinal direction of the feed-in needle. Particularly preferably, a device that is used to carry out the method features at least one drive, such as an electric motor, which is used to rotate the feed-in needle about the rotational axis. In this way, even if the direction of movement of the feed-in needle changes, it is possible to adjust the orientation of the feed-in opening so that the relative orientation between direction of movement and the direction of the feed-in opening remains constant. In a preferred embodiment, the orientation of the feed-in opening relative to the direction of movement of the feed-in needle changes while the feed-in needle moves along the at least almost closed path. This additional degree of freedom allows for a far greater variety of objects that can be produced.

Preferably, the feed-in needle has a flow profile which orients the feed-in needle along the direction of movement of the feed-in needle, the flow profile preferably featuring at least one orientation element that protrudes from the feed-in needle and rotates it about the rotational axis when the feed-in needle moves. This can be as an alternative or in addition to a drive. In this case, if the direction of movement of the feed-in needle changes, the flow profile, preferably the orientation element, ensures that the feed-in needle also rotates about its rotational axis and orients itself in such a way that the flow profile of the feed-in needle offers a minimal flow resistance in the new direction of movement. The flow profile can preferably be changed, especially preferably by changing the orientation element in its orientation and/or position relative to the feed-in needle.

Preferably, the distance between the starting position and the end position corresponds to or is smaller than the outer diameter of the feed-in needle. The feed-in opening preferably points backwards in relation to the direction of movement of the feed-in needle. To produce a three-dimensional object with a closed cross-section, it is advantageous and often necessary for the manufacturing material that is fed from the feed-in needle into the support material at the starting position to bond with the material fed in at the end position. This can be achieved, for example, by the feed-in needle driving or being driven into the manufacturing material that has already been fed into the support material on its way to the end position. The manufacturing material that leaves through the feed-in opening of the feed-in needle at this moment comes into contact with the existing manufacturing material. This preferably results in the bonding of the manufacturing material, either during this process or after it. To avoid a double quantity of material at this point, it is advantageous to reduce the amount of exiting manufacturing material at the starting point and/or at the end point. Once the feed-in needle has left the starting position, the amount of manufacturing material exiting per time unit is increased. Before reaching the end position, the exiting amount per time unit is reduced again.

As an alternative, the end position may also just be located close to the starting position. There is thus no completely closed path and, therefore, also no completely closed cross-section of the three-dimensional object to be produced; rather, the path and the cross-section are just almost closed. If the end position is as close as possible to the starting position, the distance between the two positions is the outer diameter of the feed-in needle.

If the feed-in needle is to be moved along a completely closed path, it is advantageous that no manufacturing material is brought to this starting position when the feed-in needle leaves the starting position. This can be achieved, for example, by the feed-in opening not pointing backwards in the direction of movement of the feed-in needle, but, for example, sideways to the direction of movement.

Preferably, the feed-in needle passes the starting position again on its way to the end position. Consequently, the movement of the feed-in need begins at the starting position, moves along the—in this case—completely closed path, passes the starting position again and finishes in the end position, which is preferably different from the starting position. In this case, the orientation of the feed-in opening relative to the direction of movement can preferably be changed, so that this orientation at the beginning of the movement of the feed-in needle, when the feed-in needle is in the starting position for the first time, is different from the orientation of the opening when it passes the starting position again. This prevents manufacturing material from being introduced twice at the same point within the support material.

In an especially preferred embodiment, the starting position and the end position are identical. In this case, if the orientation of the feed-in opening is identical at the starting position and the end position, it results in a completely closed layer of manufacturing material, which is introduced into the support material. During this process, the orientation can be changed on the way from the starting position to the end position or remain the same.

Advantageously, the at least one feed-in needle comprises at least one elongated feed-in opening and/or multiple feed-in openings along the feed-in line that are preferably fed, particularly preferably independently from each other, with manufacturing material through multiple supply lines. As described above, in the method according to the invention and the embodiments described here, manufacturing material is introduced along the feed-in line into the support material. This may be achieved in various ways. The feed-in line can be formed by a single elongated feed-in opening that follows the contour of the feed-in line. Alternatively, multiple feed-in openings may be provided, of which at least one, but preferably multiple, especially preferably all of which, are designed to be elongated. This results in an especially homogeneous and smooth wall, i.e. outer side and/or inner side, of the introduced material layer made of manufacturing material. The respective feed-in opening can have a width that extends transversely to its longitudinal extension, the width changing or remaining constant over the longitudinal extension. The manufacturing material that is to be introduced into the support material through the feed-in opening is guided to the feed-in opening via the supply line. If the same amount of manufacturing material per time unit is now to exit across the entire length of the elongated feed-in opening in order to achieve a homogeneous wall thickness of the three-dimensional object to be produced, it is advantageous to change the width of the feed-in opening so that manufacturing material guided via the supply line first reaches a narrow feed-in opening and then expands.

Preferably, multiple supply lines are provided through which manufacturing material is fed to multiple feed-in openings. This preferably occurs independently of each other, so that identical or different amounts of manufacturing material per time unit can be introduced into the support material through different feed-in openings. In addition, different manufacturing materials, which may differ in terms of additives, for example, can be introduced into the support material at the same time.

Preferably, different amounts of manufacturing material per time unit can be introduced into the support material through multiple feed-in openings. This makes it possible to produce, for example, different wall thicknesses of the three-dimensional object to be produced in a single process step and with a single revolution of the feed-in needle.

In a preferred embodiment, different manufacturing materials are introduced into the support material through multiple feed-in openings. To this end, it is advantageous if the different materials are each guided to the respective feed-in opening through their own supply lines. It is possible for only one production material at a time to be introduced into the support material through a single feed-in opening. Alternatively, it is also possible and in some applications advantageous for different manufacturing materials to be introduced into the support material one after the other through a common feed-in opening. Another manufacturing material is then preferably guided through a further feed-in opening. It is possible to introduce different manufacturing materials into the support material one after the other or at the same time. This renders it possible to make the three-dimensional object to be produced from more than just one manufacturing material and therefore to vary different properties, such as elasticity, rigidity, thermal and/or electrical conductivity and/or color.

Preferably, the path is circular or in the shape of a circular arc. Particularly preferably, the three-dimensional object, or at least part of the three-dimensional object, has at least one open and one closed end and, particularly preferably, is designed to be in the shape of a container, such as a cup. In an especially preferred embodiment, the three-dimensional object, or at least one part of the three-dimensional object, is designed to be rotationally symmetrical.

The three-dimensional object is preferably an orthopaedic device or part of an orthopaedic device, especially preferably a prosthesis liner. In the present case, an orthopaedic device is understood particularly to mean orthoses and prostheses and their components. Orthopaedic shoes, shoe inserts and similar devices are also considered orthopaedic devices.

A range of different materials are used in orthopaedic devices that take into account the various profiles of requirements of the respective device. Nowadays, prosthesis sockets in particular are produced for the patient on an individual basis and are therefore especially well-suited for the use of an additive manufacturing process. The prosthesis is fixed and arranged on an amputation stump. A range of fixing systems exists, one fixing system being known as vacuum socket technology. In this process, the volume between the amputation stump and the inner wall of the socket is evacuated when the device is in the mounted state. A prosthesis liner can be arranged on the stump for sealing and cushioning purposes, said prosthesis liner usually comprising a closed distal end and a proximal access opening and surrounding the stump when mounted. By inserting the stump equipped with the liner, a volume is created between the outer side of the prosthesis liner and the inner side of the prosthesis socket that can be evacuated, which leads to a force-locking connection between the socket and the liner.

To achieve a permanent attachment of the prosthesis socket, it is necessary to seal the volume between the prosthesis liner and the prosthesis socket against the atmosphere. For this purpose, so-called caps or sleeves are provided that are pulled over the proximal edge of the prosthesis socket and rest on the outer side of the liner or the stump, thereby sealing a gap. As an alternative, sealing lips may be arranged on the outer side of the liner or the inner side of the socket. The method of the type described here renders it possible to produce such a liner either completely or partially by means of the additive manufacturing process, wherein sealing lips and other elements arranged on the liner are preferably also produced in the same manufacturing step by means of the additive manufacturing process.

The invention also solves the addressed task by way of a device for carrying out a method described here. Such a device usually features a container that holds the support material and into which the feed-in needle protrudes. In this case, the feed-in needle can be moved in three directions, which are linearly independent from each other, and has at least one feed-in opening, which is preferably arranged at the lower end of the feed-in needle. Manufacturing material is introduced through the feed-in opening and through the feed-in needle into the container and thus into the support material.

Preferably, at least one feed-in needle is rotatably mounted about a rotational axis, which is preferably its longitudinal axis, wherein the device preferably has at least one drive for rotating the feed-in needle. Such a drive may be a motor, for example, such as an electric motor. The orientation of the at least one feed-in opening of the feed-in needle relative to the direction of movement of the feed-in needle can therefore be changed. For example, the direction of movement of the feed-in needle can be changed without the orientation of the feed-in opening relative to this direction of movement changing. Alternatively, the orientation can even be changed without the direction of movement changing. Of course, it is also possible to change both the direction of movement of the feed-in needle and the orientation of the feed-in needle relative to this direction of movement.

In the following, a number of embodiment examples of the invention will be explained in more detail with the aid of the accompanying drawings. They show FIG. 1—the schematic view of the method according to an embodiment example of the present invention, FIG. 2—different paths along which the feed-in needle can be moved, FIG. 3—different shapes of feed-in needle, FIG. 4—a schematic view of part of the method according to a further embodiment example of the present invention, FIG. 5—a schematic view of part of the method according to a further embodiment example of the present invention and FIGS. 6, 7—different embodiments of a feed-in needle in different representations in each case.

FIG. 1 schematically depicts part of a feed-in needle 2 that is used to insert a manufacturing material into a support material. In the upper part of FIG. 1 the feed-in needle 2 is reduced to its feed-in opening 4, which forms a feed-in line 6. In the embodiment example shown, the feed-in opening 4 has a first end 8, which can also be described as the end near the device, and a second end 10 opposite the first end 8, which can be described as the end far from the device. The feed-in needle 2 is usually guided from above, where it is arranged on the rest of the device that is needed to carry out the method. A path arrow 12 describes a path executed by the feed-in needle 2 in order to create the three-dimensional object that is to be produced. In the embodiment example shown, the path and thus also the path arrow 12 is described by a circle.

The lower part of FIG. 1 contains the three-dimensional object that is created with the arrangement from the upper part of FIG. 1. A cylinder 14 can be seen with a first opening 16, which lies opposite a second opening 18, not shown here. While the feed-in needle 2 depicted in the upper part of FIG. 1 describes a path along the path arrow 12 and is moved along this path, the manufacturing material exits through the feed-in opening 4 along the entire feed-in line 6, said manufacturing material thus being introduced into the support material, which is not depicted for reasons of clarity.

Figures 2, 3:
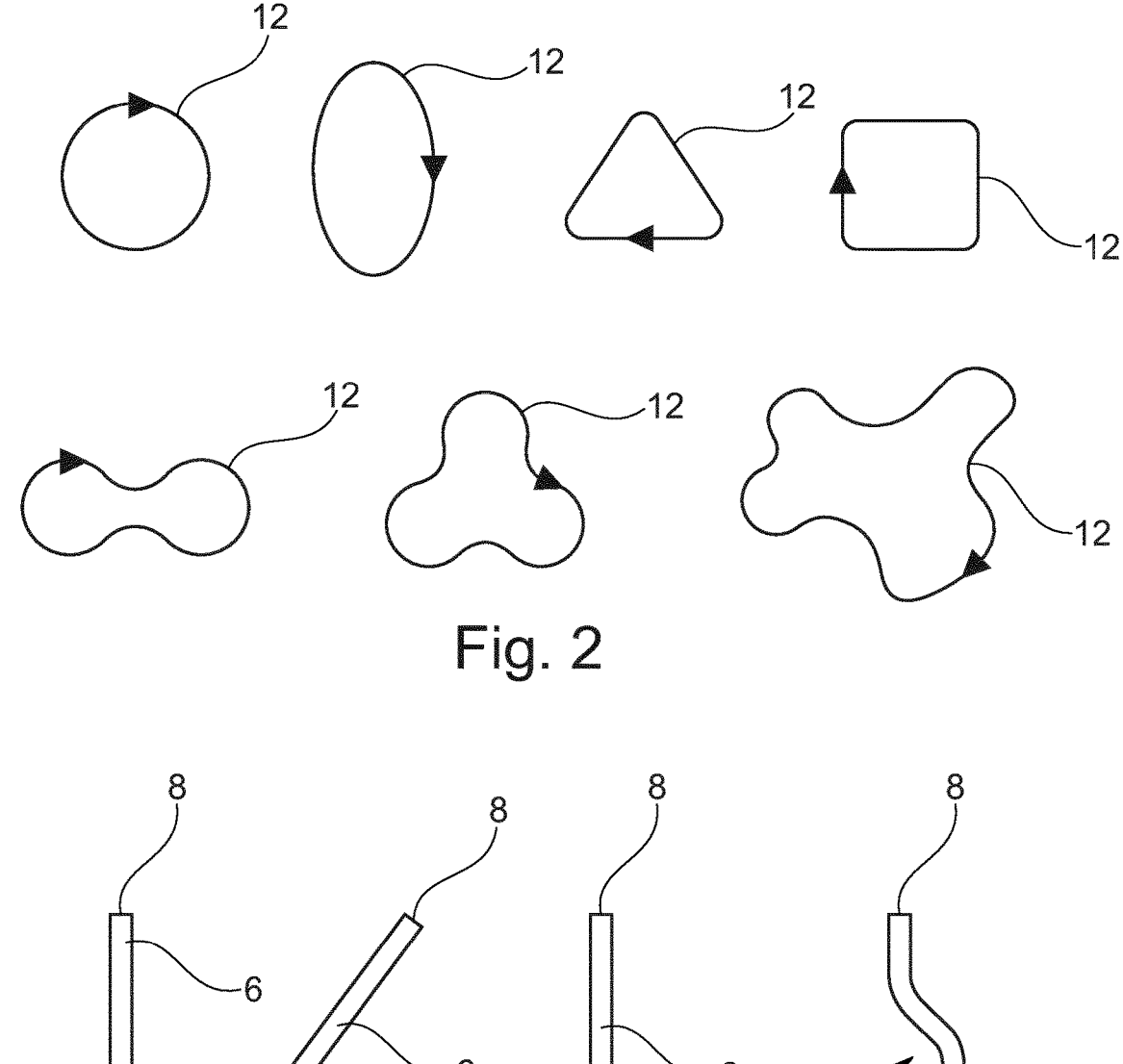

FIG. 2 depicts various path arrows 12, which can be used for different three-dimensional objects to be produced. In addition to the circle, the path arrow 12 can also create an oval, a triangle with rounded corners, where appropriate, or a rectangle, in particular a square. Irregular forms, such as those shown in the bottom row, can also be used independently to create a three-dimensional object. If one of the paths depicted in FIG. 2 is used in the method schematically depicted in FIG. 1, an object is created whose cross-section parallel to the curve of the path is the exact shape of the path arrow 12.

FIG. 3 depicts different feed-in openings 4 by which different feed-in lines 6 are formed. Each feed-in line 6 extends between the first end 8 and the second end 10 of the respective feed-in opening 4. The feed-in opening 4 shown at the far left of FIG. 3 corresponds to the one shown in FIG. 1 and can be used to produce cylindrical three-dimensional objects, for example. In this context, a cylindrical object is understood to mean an object with a first opening 16 and an opposite second opening 18 that has a constant cross-section. This preferably corresponds to the curve of the path or the path arrow 12 used. The feed-in line 6 shown to the right of this features a kink 20 and can be used, for example, to produce a knee cap or similar component. In this case, the feed-in needle 2 used preferably does not move along a closed path. Rather, the path has a starting position and an end position, between which there is a certain distance. For example, they may be joined by a path that is a circular arc.

The feed-in line 6 shown to the right of this (second from the right) is preferably used when an object, for example a prosthesis liner, is to be produced that only has an opening at one end. The needle is preferably moved along a circular path, as shown, for example, in FIG. 1 and in the upper left of FIG. 2, so that the second end 10 of the feed-in line 6 preferably does not move, but at most carries out a rotation on the spot. This results in a cup-shaped three-dimensional object. At the far right of FIG. 3 a free-form feed-in line 6 is shown, as used to produce individually customized components.

Figures 4, 5, 6, 7:
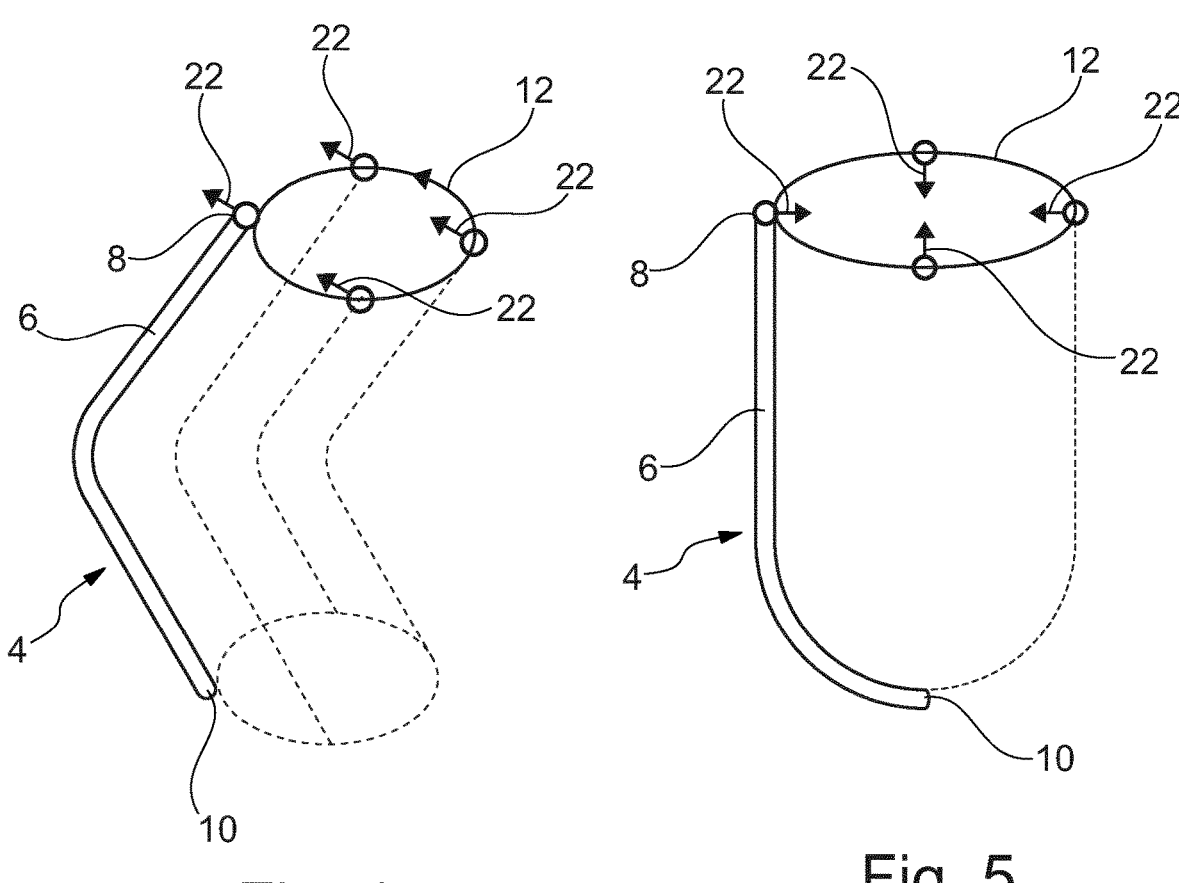

FIGS. 4 and 5 each show a schematic view of part of a method. Again, the feed-in line 6 of the feed-in opening 4 with its upper end 8 and the lower end 10 is depicted. In both FIG. 4 and in FIG. 5 a path arrow 12 is shown, which in each case is designed to be circular and along which the feed-in needle 2 and therefore also the feed-in opening 4 is moved. However, the shape, size and design of the three-dimensional object to be produced cannot be created and changed simply by displacing the feed-in needle 2. A rotation of the feed-in needle can also be carried out to produce the object. This is depicted by the arrows 22, which indicate the feed-in direction. FIG. 4 shows all of these arrows 22 in the same direction. This indicates that the three-dimensional object schematically depicted by the dashed lines is produced by moving the feed-in opening 4 along the path defined by the path arrow 12, without undertaking an additional rotation of the feed-in needle 2 and thus of the feed-in opening 4. The feed-in device, which is depicted by the arrows 22, does not change as a result.

The situation in FIG. 5 is different. In FIG. 5, if one were to only move the feed-in opening 4 from FIG. 5 and the feed-in needle 2, to which the feed-in opening 4 belongs, along the path arrow 12 without causing an additional rotation of the feed-in needle 2, it would result in a three-dimensional object with a constant cross-section and a curve that would correspond to the curve of the feed-in line 6. However, if a three-dimensional object that is closed at the bottom is to be produced, as indicated by the dashed lines, a rotation of the feed-in needle 2 must also occur in addition to the movement of the first end 8 along the path arrow 12. This is depicted by the arrows 22 which point in different directions at different positions of the path arrow 12; in the embodiment example, they all point to the center of the circle formed by the path arrow 12.

The left-hand illustration in FIG. 6 depicts part of a feed-in needle 2 with the feed-in opening 4 that forms the feed-in line 6. This part of the feed-in needle 2 can be considered as a laterally cut part of a tube or a pipe. Of course, this part can also be designed to be curved, as shown in FIG. 5, for example. In the embodiment example shown, the feed-in line 6 is formed by a single feed-in opening 4 that extends along the feed-in line 6. If such a feed-in needle 2 is used, manufacturing material passes into the support material over the entire feed-in line 6. The width of the feed-in opening 4, i.e. the distance between the two edges in the circumferential direction, may vary so as to ensure a desired, preferably constant, distribution of the exiting manufacturing material.

An alternative embodiment is shown in FIG. 7. Here, too, the feed-in line 6 extends between the first end 8 and the second end 10; however, in this embodiment, it is formed of multiple, in particular four, feed-in openings 4 that are arranged adjacent to one another along the feed-in line 6. The sectional view in the right-hand part of FIG. 7 shows that the manufacturing material enters this area of the feed-in needle 2 via a supply channel 24. There, the material is distributed in a valve block 26 to several channels 28, each leading to one of the feed-in openings 4. The valve block 26 has an individual valve 30 for each channel 28, wherein said valves can preferably be controlled separately from one another. The individual valves 30 can preferably be opened and closed on an individual basis. Particularly preferably, the valves 30 are not switch valves that can either be opened or closed. Preferably, the valves 30 may also restrict or expand the passage from the supply channel 24 to the individual channels 28. The amount of the manufacturing material exiting the respective feed-in openings 4 per time unit can therefore be individually controlled and adapted to the desired values.

REFERENCE LIST

2 feed-in needle
4 feed-in opening
6 feed-in line
8 first end
10 second end
12 path arrow
14 cylinder
16 first opening
18 second opening
20 kink
22 arrow
24 supply channel
26 valve block
28 channel
30 valve

The invention claimed is:

1. A method for producing a three-dimensional object by an additive manufacturing process, comprising:
   feeding a manufacturing material in a free-flowing state through at least one feed-in opening of at least one feed-in needle into a supporting material, wherein the at least one feed-in opening is configured such that the manufacturing material can be fed through it into the supporting material along a feed-in line:
   moving the feed-in needle from a starting position to an end position, wherein the starting position and the end position are so close together that the feed-in needle moves along an at least almost closed path; and
   curing the manufacturing material to produce the three-dimensional object, wherein a course, an extension and/or a length of the feed-in line is selected such that the three-dimensional object is produced with a single revolution of the feed-in needle,
   wherein at least part of the three-dimensional object comprises an open end and a closed end,
   wherein the at least one feed-in needle comprises multiple feed-in openings along the feed-in line,
   wherein the at least one feed-in needle comprises the multiple feed-in openings along the feed-in line of a single feed-in needle, and the method further comprises feeding different amounts of manufacturing material per time unit into the support material through the multiple feed-in openings.

2. A method for producing a three-dimensional object by an additive manufacturing process, comprising:

feeding a manufacturing material in a free-flowing state through at least one feed-in opening of at least one feed-in needle into a supporting material, wherein the at least one feed-in opening is configured such that the manufacturing material can be fed through it into the supporting material along a feed-in line;

moving the feed-in needle from a starting position to an end position, wherein the starting position and the end position are so close together that the feed-in needle moves along an at least almost closed path; and curing the manufacturing material to produce the three-dimensional object, wherein a course, an extension and/or a length of the feed-in line is selected such that the three-dimensional object is produced with a single revolution of the feed-in needle, wherein at least part of the three-dimensional object comprises an open end and a closed end, wherein the at least one feed-in needle comprises multiple feed-in openings along the feed-in line, wherein the at least one feed-in needle comprises the multiple feed-in openings along the feed-in line of a single feed-in needle, and the method further comprises feeding different manufacturing materials into the support material through the multiple feed-in openings.

3. A method for producing a three-dimensional object by an additive manufacturing process, comprising:

feeding a manufacturing material in a free-flowing state through at least one feed-in opening of at least one feed-in needle into a supporting material, wherein the at least one feed-in opening is configured such that the manufacturing material can be fed through it into the supporting material along a feed-in line;

moving the feed-in needle from a starting position to an end position, wherein the starting position and the end position are so close together that the feed-in needle moves along an at least almost closed path; and curing the manufacturing material to produce the three-dimensional object, wherein a course, an extension and/or a length of the feed-in line is selected such that the three-dimensional object is produced with a single revolution of the feed-in needle, wherein at least part of the three-dimensional object comprises an open end and a closed end, wherein the at least one feed-in opening comprises multiple feed-in openings along the feed-in line of a single feed-in needle, and wherein the multiple feed-in openings are fed independently from each other with the manufacturing material through multiple supply lines.

* * * * *